UNITED STATES PATENT OFFICE.

HENRY P. DODGE, OF TOLEDO, OHIO.

PROCESS OF TREATING LIME.

SPECIFICATION forming part of Letters Patent No. 671,621, dated April 9, 1901.

Application filed February 15, 1900. Serial No. 5,372. (No specimens.)

*To all whom it may concern:*

Be it known that I, HENRY P. DODGE, a citizen of the United States, residing at Toledo, county of Lucas, and State of Ohio, have invented a certain new and useful Process of Treating Lime, of which the following is a specification.

My invention has for its object the economical production on a commercial scale of slaked lime in a pulverulent form capable of being kept for considerable periods of time in ordinary receptacles or in the open air without liability of spontaneously caking, swelling, or otherwise changing its form or condition.

The invention consists in the art, mode, or method, hereinafter set forth, of treating fresh-burned lime whereby these results are attained.

With a view to rendering more clear the mode of treatment, the reasons for the several steps, and the distinctions existing between this and other plans adopted or proposed some preliminary observations are deemed proper. Lime varies considerably in its chemical composition, particularly in regard to the proportion of magnesia present. Lime containing a considerable percentage of magnesium—say twenty-five per cent. or over—even when reduced to a granular or to a pulverulent condition if exposed to contact with water for a time acts in a manner similar to so much sand and may be stirred and mixed with the water in a way to expose all particles thereto and to cause each to be coated with a thin film thereof. The period necessary to such coating varies from about one minute to about five minutes, according to the character of the lime, the size of its particles, and, perhaps, other considerations not so apparent or perfectly understood. After the lapse of such period of time, however, a chemical action begins, the lime undergoing change from an oxid to a hydrate. When this change is fairly begun, it is impracticable to readily stir or agitate the particles and present them separately to the water, because the oxids of lime and of magnesia take up more water than is required to completely satisfy the molecular change. Some portions of the mass become unduly wet and pack together and others do not receive sufficient water unless more be present than is necessary to complete hydration. Where the percentage of magnesium is smaller than above indicated, the period during which the stirring or agitation of the lime in the presence of or in contact with water may be performed is shorter. To insure uniformity in treatment and in the resultant product, it is necessary that the particles be quite small and as nearly uniform in size as possible, because, owing to the capacity of lime to take up more moisture than is requisite for its conversion into a hydrate, smaller particles would be more speedily permeated by the water than larger ones and continuing to absorb water they would become so charged that, although not appearing wet to the eye, they would, nevertheless, pack and cake subsequently, while the larger particles would be robbed of water needed to complete their hydration. Owing also to the longer time required to permeate the larger particles, they would contain after treatment considerable quantities of unconverted oxid or unslaked lime, and hence would be liable to swell and burst and to rupture the containing-package.

From the foregoing it will be apparent that the fresh-burned lime to be slaked should be in a state of somewhat fine subdivision and the particles should be as nearly uniform as practicable. It will further be seen that because of the necessity of thoroughly stirring, mixing, or agitating the lime and water before the chemical conversion begins or proceeds with any considerable activity it is desirable to employ lime containing a reasonable percentage of magnesium. On the other hand, absolute uniformity of size is of course unattainable, and a reasonable range or variation is permissible. So, too, as different methods of agitation may effect exposure of all the particles to water with different degrees of rapidity the presence of magnesium in the indicated quantity or in any material quantity may in some instances prove unnecessary. In view of these facts it is to be understood that the process hereinafter specifically described is not restricted to treatment of lime containing magnesia in the proportion indicated or in any considerable quantity nor to the preliminary crushing or reducing of the lime as a step in the process of treatment, it being possible to obtain from the kiln and from the repeated handling of the lime a very considerable quantity of fine material, which, being properly sifted or screened, may be treated without previous special crushing or reduction. Having thus explained in a general way these matters, I will describe specifically the process practiced by me and found effective and satisfactory, observing in this connection that the lime used by me has contained, approximately, forty per cent. of the oxid of magnesium, being produced from a limestone found in the State of Ohio and commonly known as "dolomite" or "dolomitic limestone."

In carrying out my invention I preferably take the bulk lime just as it is drawn from the kilns after burning in lumps of varying sizes and grind, crush, or otherwise reduce it to a fine powder. The powder so produced is advisably screened or sifted to take out any particles not sufficiently reduced and to insure an even grading of the lime. A measured quantity of the powder or fine granular mass is then subjected to rapid stirring or agitation in a suitable vat or tank, and water is added while the agitation proceeds. The quantity of water used is to be accurately determined and must bear a definite relation to the quantity of lime treated. The relative proportions may and will vary somewhat according to the chemical composition of the lime. With a lime of the character above noted and containing about thirty to forty per cent. of magnesium oxid I find it advisable to use about one to one and one-half quarts of water to every five pounds of lime. The proportion is based upon the quantity of water necessary to convert all the lime from an oxid to a hydrate, and it is important that the proper proportion be nicely determined and accurately observed. Owing to the rapid and thorough agitation of the mass of lime, all its particles are exposed or subjected to the water, which accordingly coats each and every particle or permeates the same and gives to each particle the quantity necessary to effect its hydration or chemical conversion. A very slight surplus of water may be used without serious detriment, since the heat generated by the chemical action will evaporate a small percentage of the water, and as the process is carried on in receptacles open to the atmosphere any vapor produced will readily pass off. Care must be taken, however, not to add water in quantity sufficient to produce a putty or plastic mass nor in excess of that required for hydration or certain of removal through evaporation. Instead of introducing the water into the lime the operation may be reversed and the lime thrown into the water and the whole subjected to rapid and thorough agitation; but it is preferred to add the water to the lime and to supply it gradually, yet with sufficient rapidity to enable the moistening of all the particles to be effected before the chemical conversion begins or proceeds to any considerable extent. The mass thus treated is now allowed to stand until cold, the great heat produced by the chemical action incident to conversion taking up and evaporating any remaining moisture and leaving the mass in a dry state and capable of use without further treatment. To insure greater uniformity and to remove any bits of unburned stone, sticks, nails or other foreign matter commonly found in the mass, it is advisable when the same is completely cooled and dried to sift the lime through a fine screen or sieve or to pass it through crushing or reducing mechanism capable of reducing to fine powder any hard particles present.

The time required to effect hydration varies somewhat according to the quality or character of the lime; but with lime of the character above noted three minutes will ordinarily suffice.

The time required for cooling depends somewhat upon the temperature of the cooling-room, atmospheric conditions, and the like, but from twelve to thirty-six hours covers the usual range.

The product obtained by the treatment above described may be used commercially in all places where quicklime can be used and in like manner. It retains its setting properties; but, unlike quicklime, it does not swell nor does it air-slake, and upon being mixed with water it does not produce heat. The product is found to answer admirably the purposes of quicklime and possesses the advantages thereover that it may be kept for long periods of time in packages of any convenient character—wood, paper, or the like—without undergoing chemical change, without solidifying or caking, and without expanding. This latter capability is evidenced by the fact that for a number of months the prepared lime has been placed upon the market in paper bags and in no case has it burst the packages or solidified.

The present invention is to be clearly distinguished from the plans or methods of preparing lime which involve the treatment thereof in the form of lumps of considerable size or varying materially or appreciably in bulk, since, as already explained, it is impracticable to attain uniformity under such conditions or to reach and wet the interior portions of lumps of any considerable size before the chemical action becomes vigorous. So, too, it is to be distinguished from any process or mode of treatment involving the total immersion of lumps and their retention for a considerable or appreciable time under water, since by reason of the avidity of lime for water the lumps or particles will take up water in excess of the quantity necessary to effect conversion to a hydrate and will retain sufficient moisture to cause a caking or packing of the lime subsequently.

It is particularly to be observed that the operation or treatment here set forth is effected in the open atmosphere and that any vapor produced is allowed to pass off freely. Hence there is entire freedom from danger through excessive pressures and there is no uncertainty as to the quantity of moisture supplied to the lime. The lime thus prepared is peculiarly white and clear.

Having thus described my invention, what I claim is—

1. The herein-described method of treating lime, which consists in reducing fresh-burned lime to a fine granular or pulverulent condition; agitating the mass, and, while in a state of agitation, exposing its particles to water in quantity sufficient to effect hydration; permitting the mass to cool, and subsequently sifting or screening the same.

2. The herein-described method of treating lime, which consists in subjecting, in the open air, fresh-burned lime in the form of fine particles or powder, to agitation in the presence of water in quantity sufficient to effect its conversion into a hydrate, but not materially in excess of such quantity; and permitting the mass after such hydration to cool and assume a dry pulverulent form.

3. The process of treating lime, which consists in subjecting the same, while in a granular or pulverulent condition, to vigorous agitation in the presence of water sufficient to effect complete hydration but not appreciably in excess thereof; permitting the mass to cool; reducing the same to pulverulent form; and screening or sifting the powdered mass to remove any particles of undue size.

In testimony that I, HENRY P. DODGE, claim the foregoing as my own I hereto affix my signature in the presence of two witnesses.

HENRY P. DODGE.

Witnesses:
H. H. BRAND,
WM. K. TERRY.